United States Patent
Woo et al.

(10) Patent No.: US 9,984,491 B2
(45) Date of Patent: May 29, 2018

(54) APPARATUS AND METHOD FOR MANAGING COMMANDS

(71) Applicant: Samsung Electronics Co., Ltd., Suwon-si (KR)

(72) Inventors: Sangoak Woo, Anyang-si (KR); Jeongae Park, Seoul (KR); Minkyu Jeong, Yongin-si (KR); Minyoung Son, Hwaseong-si (KR); Seokyoon Jung, Seoul (KR); Jeongwook Kim, Seoul (KR); Soojung Ryu, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 35 days.

(21) Appl. No.: 15/035,170

(22) PCT Filed: Nov. 4, 2014

(86) PCT No.: PCT/KR2014/010505
§ 371 (c)(1),
(2) Date: May 6, 2016

(87) PCT Pub. No.: WO2015/069001
PCT Pub. Date: May 14, 2015

(65) Prior Publication Data
US 2016/0292906 A1    Oct. 6, 2016

(30) Foreign Application Priority Data

Nov. 6, 2013   (KR) .................. 10-2013-0134199

(51) Int. Cl.
*G09G 5/36*      (2006.01)
*G06T 15/00*     (2011.01)
(Continued)

(52) U.S. Cl.
CPC .............. *G06T 15/005* (2013.01); *G06F 9/46* (2013.01); *G06T 15/04* (2013.01); *G06T 15/80* (2013.01)

(58) Field of Classification Search
CPC ....... G06T 15/00; G06T 15/04; G06T 15/405; G06T 17/00; G09G 5/363; G09G 5/399
See application file for complete search history.

(56) References Cited

U.S. PATENT DOCUMENTS 5,909,224 A   6/1999  Fung
6,570,565 B1 * 5/2003  Park ..................... G06T 15/005
                                                   345/421
(Continued)

FOREIGN PATENT DOCUMENTS

JP     2004-15225 A    1/2004
JP     2007-200251 A   8/2007
(Continued)

OTHER PUBLICATIONS

Wang et al. ("GPU accelerated 2-D staggered-grid finite difference seismic modelling", Journal of Software, vol. 6, No. 8, Aug. 2011.*
(Continued)

*Primary Examiner* — Hau H Nguyen
(74) *Attorney, Agent, or Firm* — Harness, Dickey & Pierce, P.L.C.

(57) ABSTRACT

Provided is a method of managing commands, which includes receiving a frame buffer object (FBO) change command, comparing an FBO designated by the FBO change command with a FBO currently processed by a graphics processing unit (GPU) to determine whether the two FBOs are the same as each other, and managing the FBO change command or a flush command based on a result of the comparison.

16 Claims, 7 Drawing Sheets

(51) Int. Cl.
G06T 15/04 (2011.01)
G06T 15/80 (2011.01)
G06F 9/46 (2006.01)

(56) References Cited

U.S. PATENT DOCUMENTS

| | | |
|---|---|---|
| 8,149,242 B2 | 4/2012 | Langyel et al. |
| 8,294,714 B1 | 10/2012 | Bakdash et al. |
| 2007/0106999 A1 | 5/2007 | Zhang |
| 2008/0141131 A1 | 6/2008 | Cerny et al. |
| 2010/0118039 A1 | 5/2010 | Labour |
| 2011/0199377 A1* | 8/2011 | Jang ............... G06T 15/20 345/426 |
| 2013/0113803 A1 | 5/2013 | Bakdash et al. |
| 2013/0120388 A1* | 5/2013 | O'Donnell ............ G06T 15/005 345/428 |

FOREIGN PATENT DOCUMENTS

| | | |
|---|---|---|
| JP | 2008-123519 A | 5/2008 |
| KR | 1998-032152 A | 7/1998 |
| KR | 10-2005-003806 A | 4/2005 |

OTHER PUBLICATIONS

International Search Report issued in counterpart International Application No. PCT/KR2014/010505 dated Feb. 9, 2015 (3 pages).

* cited by examiner

[Fig. 2]
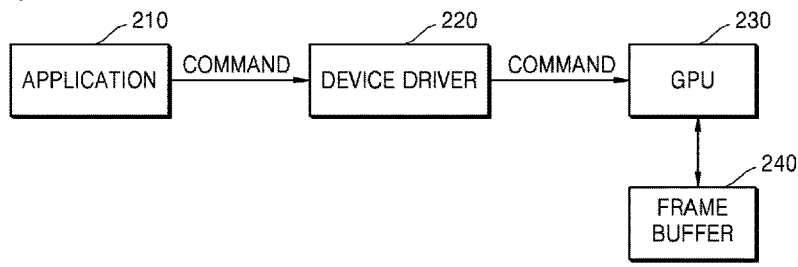
[Fig. 3]
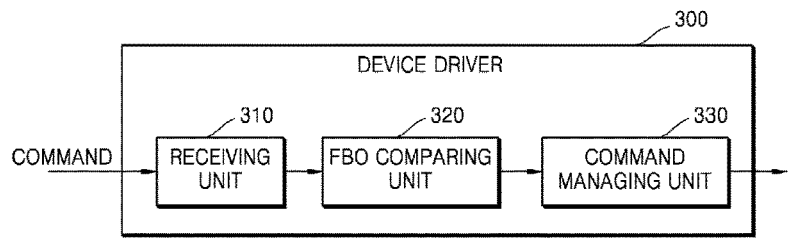
[Fig. 4]
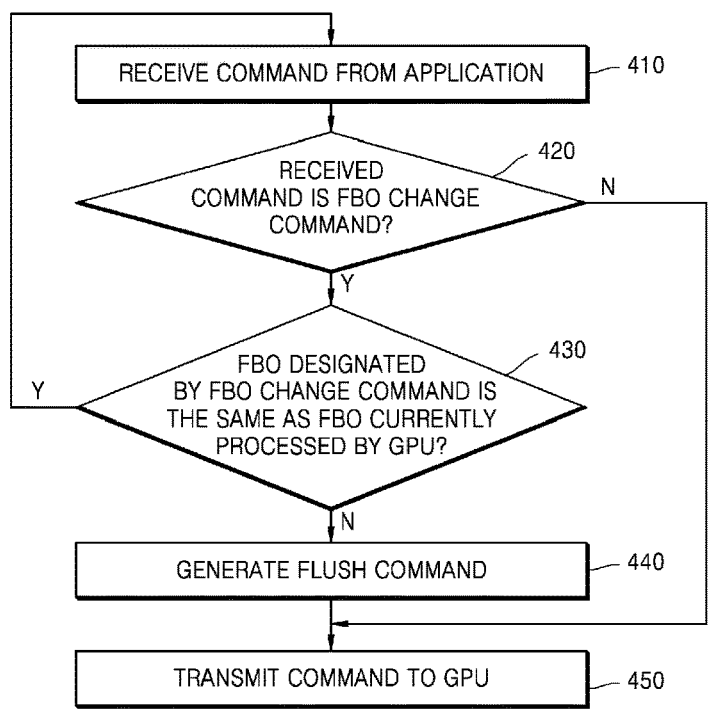

[Fig. 5]
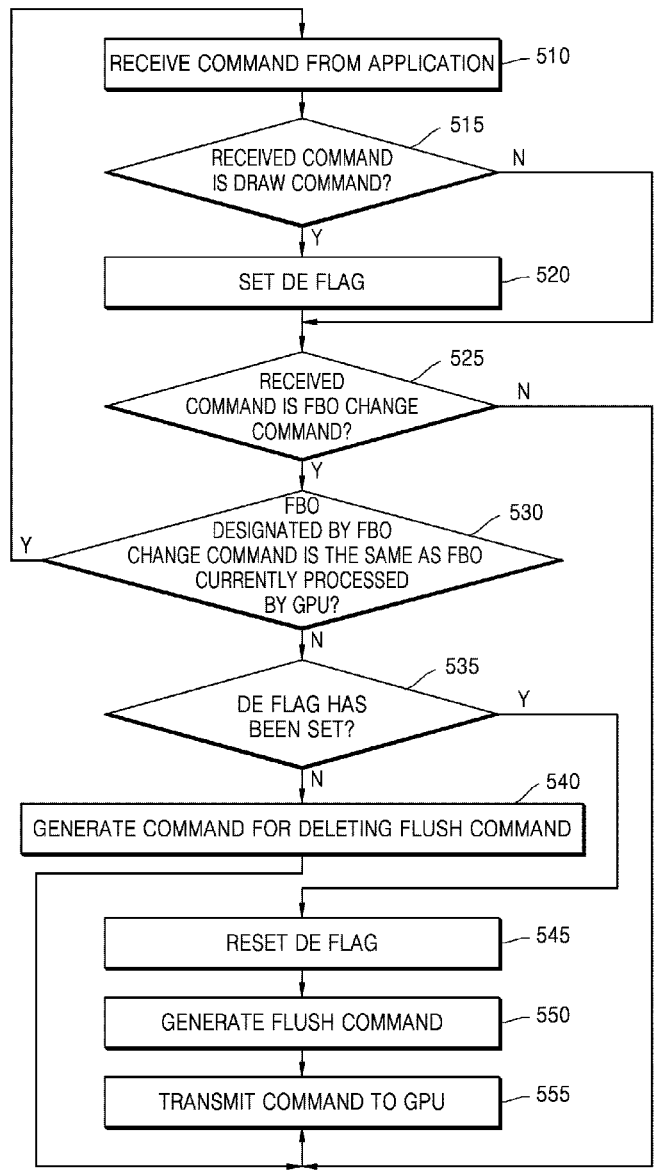

[Fig. 9]
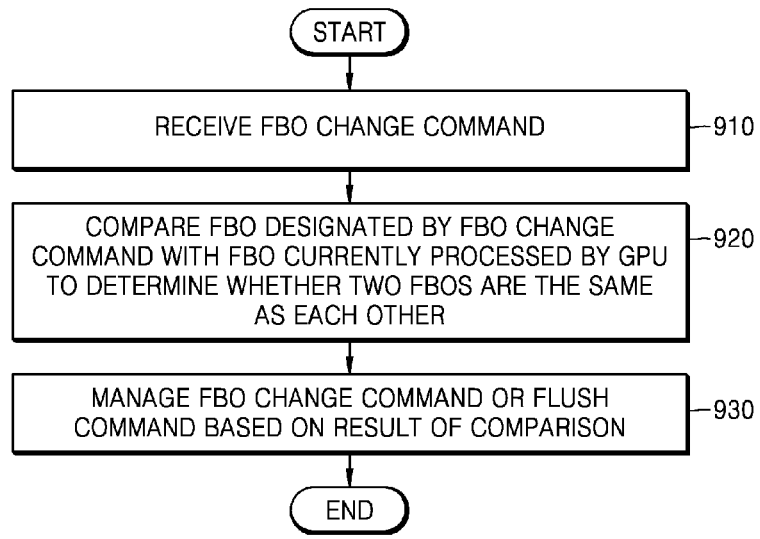
[Fig. 10]
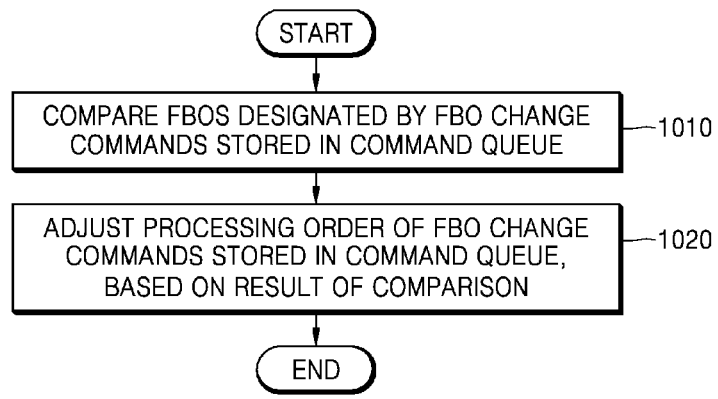

APPARATUS AND METHOD FOR MANAGING COMMANDS

CROSS-REFERENCE TO RELATED APPLICATIONS

This application claims the benefit under 35 USC 119(a) of PCT Application No. PCT/KR2014/010505, filed on Nov. 4, 2014, which claims the benefit of Korean Patent Application No. 10-2013-0134199 filed Nov. 6, 2013, in the Korean Intellectual Property Office, the entire disclosure of which is incorporated herein by reference for all purposes.

TECHNICAL FIELD

The present disclosure relates to an apparatus and method for rendering a three-dimensional (3D) image.

BACKGROUND ART

OpenGL, Open GL ES, and Direct 3 are examples of three-dimensional (3D) graphics application program interface (API) standards. The API standards include performing rendering with respect to each frame and displaying images. When rendering is performed on each frame, much computation is performed and much power is consumed. Therefore, a need exists to reduce the amount of computation and the number of accesses to a memory during rendering.

DISCLOSURE OF INVENTION

Solution to Problem

Provided is a method and apparatus for efficiently processing commands received from an application.

Provided is a computer-readable recording medium having recorded thereon a program for executing the method on a computer.

Advantageous Effects of Invention

As described above, according to the one or more of the above embodiments of the present invention, commands are managed according to whether an FBO designated by a received FBO change command is the same as an FBO currently processed by the GPU, thereby minimizing change of the FBO currently processed by the GPU.

Moreover, by adjusting a processing order of FBO change commands stored in the command queue, change of the FBO currently processed by the GPU may be avoided.

BRIEF DESCRIPTION OF DRAWINGS

FIG. 2 is a block diagram illustrating a connection relationship between devices according to an embodiment of the present invention;

FIG. 3 is a block diagram illustrating a device driver according to an embodiment of the present invention according to an embodiment of the present invention;

FIG. 4 is a flowchart illustrating a method of managing commands according to an embodiment of the present invention;

FIG. 5 is a flowchart illustrating a method of managing commands according to an embodiment of the present invention;

FIG. 9 is a flowchart illustrating a method of managing commands according to an embodiment of the present invention; and FIG. 10 is a flowchart illustrating a method of managing commands according to an embodiment of the present invention.

BEST MODE FOR CARRYING OUT THE INVENTION

Figure 1:
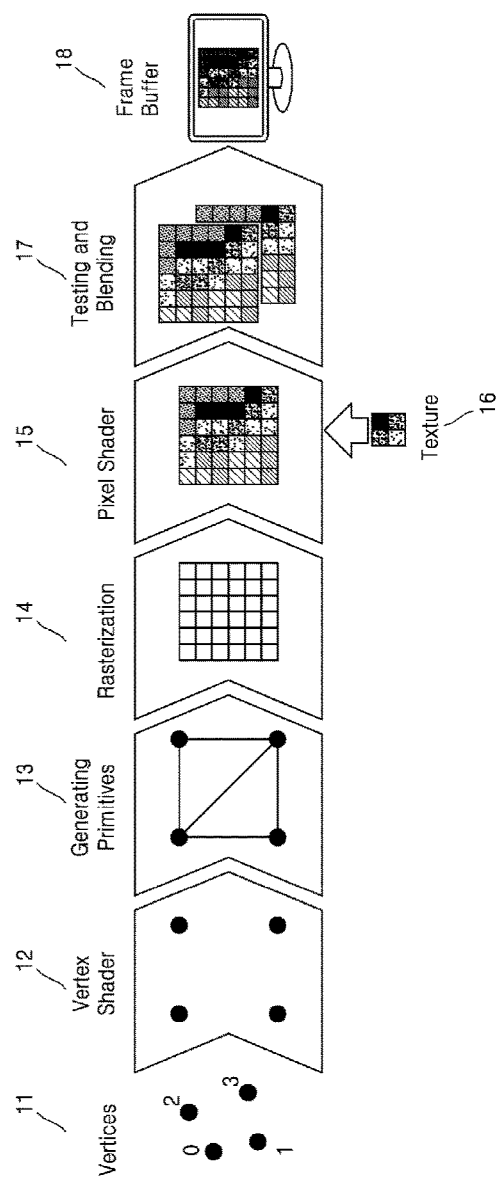
FIG. 1 is a diagram illustrating an operation of processing a three-dimensional (3D) image.

According to an aspect of the present invention, a method of managing commands includes receiving a frame buffer object (FBO) change command, comparing an FBO designated by the FBO change command with a FBO currently processed by a graphics processing unit (GPU) to determine whether the two FBOs are the same as each other, and managing the FBO change command or a flush command based on a result of the comparison.

According to another aspect of the present invention, a method of managing commands includes comparing frame buffer objects (FBOs) designated by FBO change commands stored in a command queue with each other and adjusting a processing order of the FBO change commands stored in the command queue, based on a result of the comparison.

According to further another aspect of the present invention, a device driver includes a receiving unit configured to receive a frame buffer object (FBO) change command, an FBO comparing unit configured to compare an FBO designated by the FBO change command with a FBO currently processed by a graphics processing unit (GPU) to determine whether the two FBOs are the same as each other, and a command managing unit configured to manage the FBO change command or a flush command based on a result of the comparison.

According to yet another aspect of the present invention, a device driver includes a frame buffer object (FBO) comparing unit configured to compare FBOs designated by FBO change commands stored in a command queue with each other and a command managing unit configured to adjust a processing order of the FBO change commands stored in the command queue, based on a result of the comparison.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a diagram illustrating an operation of processing a three-dimensional (3D) image. Referring to FIG. 1, the 3D image is processed in operations 11 through 17.

In operation 11, vertices indicating an image are generated. The vertices are generated to indicate objects included in the image.

In operation 12, the generated vertices are shaded. A vertex shader designates a color for the vertices generated in operation 10 to shade the generated vertices.

In operation 13, primitives are generated. The primitive indicates a polygon generated from points, lines, or vertices. For example, the primitives may indicate triangles formed by connecting the vertices.

In operation 14, the primitives are rasterized. Rasterizing the primitives means dividing the primitives into a plurality of fragments. The fragment is a unit of a primitive and may be a basic unit for image processing. The primitive includes information about vertices. Thus, when fragments between vertices are generated during rasterization, interpolation is performed.

In operation 15, pixels are shaded. Although shading is performed on a pixel basis in FIG. 1, shading may also be performed on a fragment basis. For example, shading a pixel or a fragment may indicate designating a color for the pixel or the fragment.

In operation 16, the pixel or the fragment is textured. Texturing uses a previously generated image when designating the color for the pixel or the fragment. For example, shading designates a color for a fragment based on computation, but texturing designates the same color as that of a previously generated image for a fragment corresponding to the previously generated image.

Operation 15 or 16 needs much computation for shading or texturing with respect to each pixel or fragment. Thus, it is necessary to reduce the amount of computation by efficiently performing shading or texturing. A Z-test (or a depth test) and hidden surface removal are representative methods for reducing the amount of computation during shading.

In operation 17, testing and blending are performed.

In operation 18, a frame stored in a frame buffer is displayed. The frame generated in operations 11 through 17 is stored in the frame buffer. The frame stored in the frame buffer is displayed through a display device.

FIG. 2 is a block diagram illustrating a connection relationship between devices according to an embodiment of the present invention.

An application 210 transmits commands including a command for instructing change of a frame buffer object (FBO) to a device driver 220. For example, a command for changing an FBO (or an FBO change command) may be a bind command. The application 210 transmits various types of commands to the device driver 220 and receives a result from the device driver 220 or a GPU 230.

The device driver 220 outputs the commands received from the application 210 to the GPU 230.

The device driver 220 adjusts a processing order of commands. The device driver 220 adjusts a processing order of the commands received from the application 210 and transmits the commands for which the processing order is adjusted to the GPU 230.

The device driver 220 transmits a new command to the GPU 230. The device driver 220 transmits a command for deleting a command that is not executed in the GPU 230 to the GPU 230. For example, the device driver 220 may transmit a command for deleting a flush command that is not executed in the GPU 230 to the GPU 230.

The GPU 230 is a rendering device for performing graphics processing. The GPU 230 may be a device that performs the operations of FIG. 1. The GPU 230 performs image processing based on a command received from the device driver 220, and outputs a generated image.

The GPU 230 may include a tile buffer. The GPU 230 may perform rendering on a tile basis. A tile-based rendering method divides a frame into a plurality of tiles and performs rendering on a tile basis.

The GPU 230 includes a command queue that is a buffer for storing received commands and sequentially processing the received commands.

The GPU 230 manages the command queue. For example, the GPU 230 may manage the command queue on an FBO basis. The GPU 230 may insert a new command between commands stored in the command queue. The GPU 230 may delete one of the commands stored in the command queue.

The GPU 230 processes the commands received from the device driver 220. For example, the GPU 230 generates an image, upon receiving a draw command. When receiving the command for deleting the flush command, the GPU 230 outputs the flush command stored in the command queue. When receiving a command asking a currently processed FBO (or a current FBO) from the device driver 220, the GPU 230 outputs an Identification (ID) or an address of the currently processed FBO to the device driver 220.

The GPU 230 transmits information stored in the tile buffer to the frame buffer 240. Upon receiving the flush command from the device driver 220, the GPU 230 transmits the information stored in the tile buffer to the frame buffer 240. When the application 210 outputs a command for changing an FBO, the device driver 220 changes the FBO and generates the flush command, and outputs the generated flush command to the GPU 230. The tile buffer supports a single FBO. Thus, upon receiving the command for changing the FBO, the device driver 220 generates the flush command to transmit the information stored in the tile buffer of the GPU 230 with the existing FBO.

The frame buffer 240 stores data about a frame. The frame buffer 240 is a kind of memory. The frame buffer 240 stores data received from the GPU 230.

The frame buffer 240 includes a plurality of FBOs, each of which may have an ID or a different address.

FIG. 3 is a block diagram illustrating a device driver 300 according to an embodiment of the present invention. Referring to FIG. 3, the device driver 300 may include a receiving unit 310, an FBO comparing unit 320, and a command managing unit 330.

The receiving unit 310 receives a command from the application 210. For example, the receiving unit 310 may receive a draw command or a FBO change command. The FBO change command may be a bind command. The draw command includes information about an object or a primitive. In other words, a draw command includes information indicating whether to perform rendering with respect to an object or a primitive. The FBO change command designates an FBO. The FBO change command designates a new FBO instead of a current FBO. That is, the FBO change command is a command for designating an FBO of the frame buffer 240 in which data is to be stored. The bind command is a command for instructing output of an image. Upon receiving the bind command, the GPU 230 outputs a result of rendering performed until reception of the bind command.

The FBO comparing unit 320 compares an FBO designated by the FBO change command with an FBO currently processed by the GPU 230 (or a current FBO) to determine whether the two FBOs are the same as each other. The FBO comparing unit 320 may determine whether the FBOs are the same as each other by comparing IDs or addresses of the FBOs.

The FBO comparing unit 320 compares FBOs designated by FBO change commands stored in the command queue with each other. The device driver 300 includes the command queue that stores commands therein. The FBO comparing unit 320 determines whether FBO change commands stored in the command queue designate the same FBO. The FBO comparing unit 320 also determines whether there are FBO change commands that designate the same FBO.

The command managing unit 330 manages an FBO change command or a flush command based on a result of the comparison performed in the FBO comparing unit 320. For example, the command managing unit 330 may delete or generate a command. The command managing unit 330 may also adjust an order of commands.

If the FBO designated by the received FBO change command is the same as the FBO currently processed by the GPU 230, the command managing unit 330 does not generate a flush command for the received FBO change command. FBO change is not needed because the FBO designated by the FBO change command and the FBO currently processed by the GPU 230 are the same as each other, such that the command managing unit 330 does not generate the flush command. Thus, the command managing unit 330 transmits draw commands received after reception of the FBO change command to the GPU 230.

If the FBO designated by the received FBO change command is the same as the FBO currently processed by the GPU 230, the command managing unit 330 deletes the received FBO change command. Thus, the command managing unit 330 stores a processing result of subsequently received draw commands in the FBO currently processed by the GPU 230.

If the FBO designated by the received FBO change command is different from the FBO currently processed by the GPU 230, the command managing unit 330 determines whether there is a draw command applied to the FBO currently processed by the GPU 230. In other words, the command managing unit 330 determines whether there is a draw command processed after designation of the FBO. The command managing unit 330 manages an FBO change command or a flush command based on a result of the determination. For example, the command managing unit 330 does not generate the flush command for the FBO change command. The command managing unit 330 may also transmit a command for deleting the flush command delivered to the GPU 230 to the GPU 230.

The command managing unit 330 adjusts a processing order of FBO change commands stored in the command queue based on a result of the comparison. In other words, the command managing unit 330 adjusts a processing order of FBO change commands to minimize change of FBOs.

The command managing unit 330 groups FBO change commands designating the same FBO, based on a result of the comparison. In other words, the command managing unit 330 classifies the FBO change commands designating the same FBO as the same group, such that such FBO change commands are sequentially processed. The command managing unit 330 also groups other commands applied to such FBO change commands, together with the FBO change commands.

FIG. 4 is a flowchart illustrating a method of managing commands according to an embodiment of the present invention. FIG. 4 shows a method in which the device driver 300 processes commands when there is no change of an FBO.

In operation 410, the device driver 300 receives a command from the application 210. The command may be a draw command, an FBO change command, or a bind command.

In operation 420, the device driver 300 determines whether the received command is an FBO change command. If the received command is an FBO change command, the device driver 300 goes to operation 430; otherwise, if the received command is not an FBO change command, the device driver 300 goes to step 450.

In step 430, the device driver 300 determines whether an FBO designated by the FBO change command is the same as an FBO currently processed by the GPU 230. If the FBO designated by the FBO change command is the same as the FBO currently processed by the GPU 230, the device driver 300 goes to step 410; otherwise, if the FBO designated by the FBO change command is not the same as the FBO currently processed by the GPU 230, the device driver 300 goes to step 440. If the FBO designated by the FBO change command is the same as the FBO currently processed by the GPU 230, the device driver 300 receives and processes the next command without changing the FBO. Otherwise, if the FBO designated by the FBO change command is not the same as the FBO currently processed by the GPU 230, the device driver 300 generates a command for changing the FBO.

In operation 440, the device driver 300 generates a flush command. The flush command is a command for instructing the GPU 230 to store data stored in the tile buffer in the FBO before change of the FBO.

In operation 450, the device driver 300 transmits a command to the GPU 230. The device driver 300 transmits the flush command to the GPU 230, or if the command received in operation 420 is not an FBO change command, the device driver 300 transmits the received command to the GPU 230.

FIG. 5 is a flowchart illustrating a method of managing commands according to an embodiment of the present invention. FIG. 5 shows a method in which the device driver 300 processes commands when there is no draw command for a previous FBO in spite of FBO change.

In operation 510, the device driver 300 receives a command from the application 210. The command may be a draw command, an FBO change command, or a bind command.

In operation 515, the device driver 300 determines whether the received command is an FBO change command. If the received command is an FBO change command, the device driver 300 goes to operation 520; otherwise, if the received command is not an FBO change command, the device driver 300 goes to operation 525.

In operation 520, the device driver 300 sets a DE flag. If the command received from the application 210 is a draw command, the device driver 300 sets a DE flag to indicate reception of the draw command. For example, a DE flag may be a 1-bit memory, such that if the DE flag is set, a value '1' may be stored in the memory indicating the DE flag, and if the DE flag is not set, a value '0' may be stored in the memory indicating the DE flag. The device driver 300 may read a value stored in the DE flag to determine whether there is a draw command applied to the current FBO.

In operation 525, the device driver 300 determines whether the received command is an FBO change command. If the received command is an FBO change command, the device driver 300 goes to operation 530; otherwise, if the received command is not an FBO change command, the device driver 300 goes to operation 555.

In operation 530, the device driver 300 determines whether an FBO designated by the FBO change command is the same as an FBO currently processed by the GPU 230. If the FBO designated by the FBO change command is the same as the FBO currently processed by the GPU 230, the device driver 300 goes to operation 510; otherwise, if the FBO designated by the FBO change command is not the same as the FBO currently processed by the GPU 230, the device driver 300 goes to operation 535. If the FBO designated by the FBO change command is the same as the FBO currently processed by the GPU 230, the device driver 300 goes to operation 510 to process the next command without generating a flush command. If the FBO designated by the FBO change command is not the same as the FBO currently processed by the GPU 230, the device driver 300 goes to operation 535 to determine whether there is a draw command applied to the current FBO.

In operation 535, the device driver 300 determines whether a DE flag has been set. If there is no draw command applied to the current FBO although the FBO designated by the FBO change command is not the same as the FBO currently processed by the GPU 230, the device driver 300 does not generate a flush command. If there is no draw command applied to the current FBO, the device driver 300 deletes an already generated flush command.

In operation 540, the device driver 300 generates a command for deleting a flush command. If the flush command is already generated and is transmitted to the GPU 230, the device driver 300 transmits a command for deleting the flush command, which is transmitted to the GPU 230, to the GPU 230.

In operation 545, the device driver 300 resets the DE flag. For example, resetting the DE flag may include setting a bit indicating the DE flag to '0'.

In operation 550, the device driver 300 generates a flush command. If the FBO designated by the FBO change command is not the same as the FBO currently processed by the GPU 230 and there is a draw command applied to the FBO currently processed by the GPU 230, the device driver 300 generates a flush command for storing data stored in the tile buffer in the FBO currently processed by the GPU 230.

In operation 555, the device driver 300 transmits a command to the GPU 230. The device driver 300 may transmit the flush command, the command for deleting the flush command, or the draw command to the GPU 230.

Figure 6:
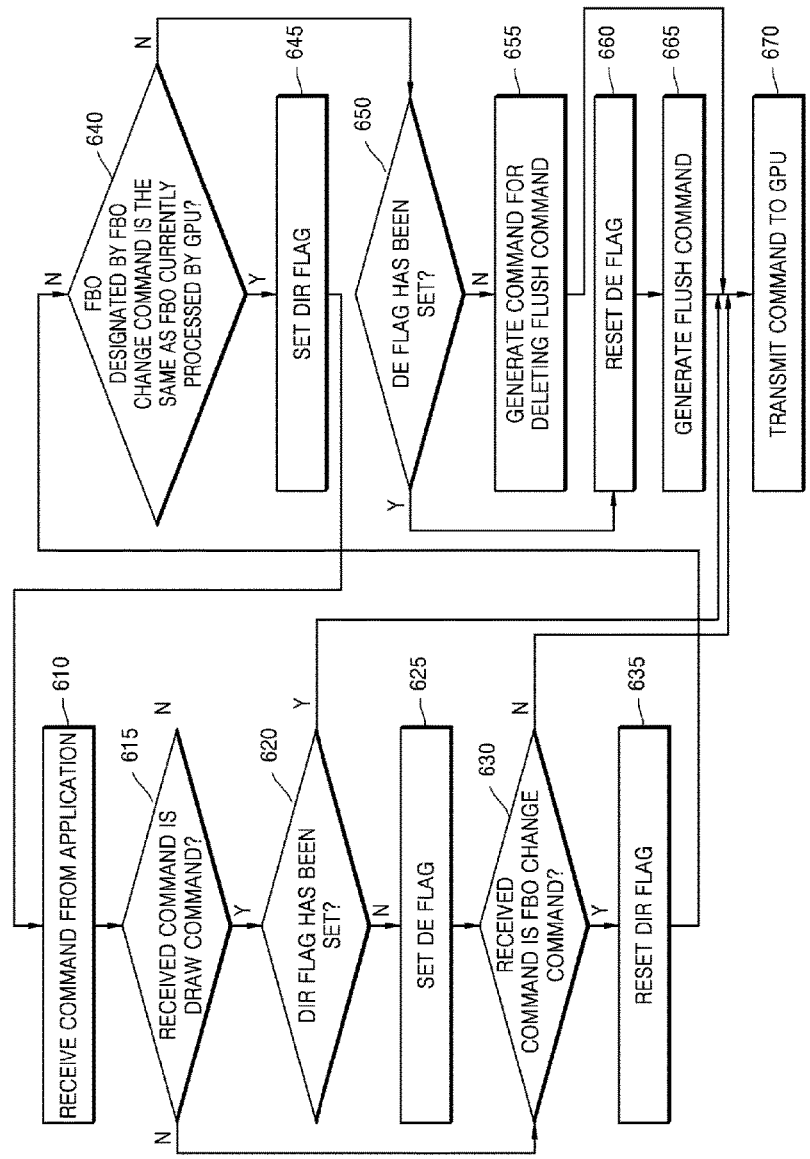
FIG. 6 is a flowchart illustrating a method of managing commands according to an embodiment of the present invention.

FIG. 6 is a flowchart illustrating a method of managing commands according to an embodiment of the present invention. FIG. 6 shows a method in which the device driver 300 processes a draw command for an FBO that is the same as the FBO currently processed by the GPU 230.

In operation 610, the device driver 300 receives a command from the application 210.

In operation 615, the device driver 300 determines whether the received command is a draw command. If the received command is a draw command, the device driver 300 goes to operation 620; otherwise, if the received command is not a draw command, the device driver 300 goes to operation 630.

In operation 620, the device driver 300 determines whether a DIR flag has been set. If the DIR flag has been set, the device driver 300 goes to operation 670; otherwise, if the DIR flag has not been set, the device driver 300 goes to operation 625. For example, the DIR flag may be a 1-bit memory, such that if the DIR flag is set, a value '1' is stored in a memory indicating the DIR flag, and if the DIR flag is not set, a value '0' is stored in the memory indicating the DIR flag. The DIR flag indicates data for preferentially processing a draw command applied to the same FBO as the FBO currently processed by the GPU 230.

In operation 625, the device driver 300 sets a DE flag. If the command received from the application 210 is a draw command, the device driver 300 sets a DE flag to indicate reception of the draw command. For example, the DE flag may be a 1-bit memory, such that if the DE flag is set, a value '1' is stored in a memory indicating the DE flag, and if the DE flag is not set, a value '0' is stored in the memory indicating the DE flag. The device driver 300 may read a value stored in the DE flag to determine whether there is a draw command applied to the current FBO.

In operation 630, the device driver 300 determines whether the received command is an FBO change command. If the received command is an FBO change command, the device driver 300 goes to operation 635; otherwise, if the received command is not an FBO change command, the device driver 300 goes to operation 670.

In operation 635, the device driver 300 resets the DIR flag. For example, resetting the DIR flag may include setting a bit indicating the DIR flag to '0'.

In operation 640, the device driver 300 determines whether the FBO designated by the FBO change command is the same as the FBO currently processed by the GPU 230. If the FBO designated by the FBO change command is the same as the FBO currently processed by the GPU 230, the device driver 300 goes to operation 645; otherwise, if the FBO designated by the FBO change command is not the same as the FBO currently processed by the GPU 230, the device driver 300 goes to operation 650.

In operation 645, the device driver 300 sets the DIR flag. If the FBO designated by the FBO change command is the same as the FBO currently processed by the GPU 230, the device driver 300 sets the DIR flag and goes to operation 610 to receive the next command. In other words, if the FBO designated by the FBO change command is the same as the FBO currently processed by the GPU 230, the device driver 300 does not generate a flush command and does not transmit the FBO change command to the GPU 230. The device driver 300 goes to operation 610 to apply a draw command to the FBO currently processed by the GPU 230.

In operation 650, the device driver 300 determines whether the DE flag has been set. If the DE flag has been set, the device driver 300 goes to operation 660; otherwise, if the DE flag has not been set, the device driver 300 goes to operation 655.

In operation 655, the device driver 300 generates a command for deleting a flush command. If the flush command has not yet been generated, the device driver 300 generates no flush command.

In operation 660, the device driver 300 resets the DE flag.

In operation 665, the device driver 300 generates a flush command. Since the FBO designated by the FBO change command is different from the FBO currently processed by the GPU 230 and there is a draw command applied to the FBO currently processed by the GPU 230, the device driver 300 generates the flush command for changing an FBO to be processed by the GPU 230.

In operation 670, the device driver 300 transmits a command to the GPU 230. The device driver 300 may transmit the draw command, the FBO change command, the flush command, or the command for deleting the flush command to the GPU 230.

Figure 7:
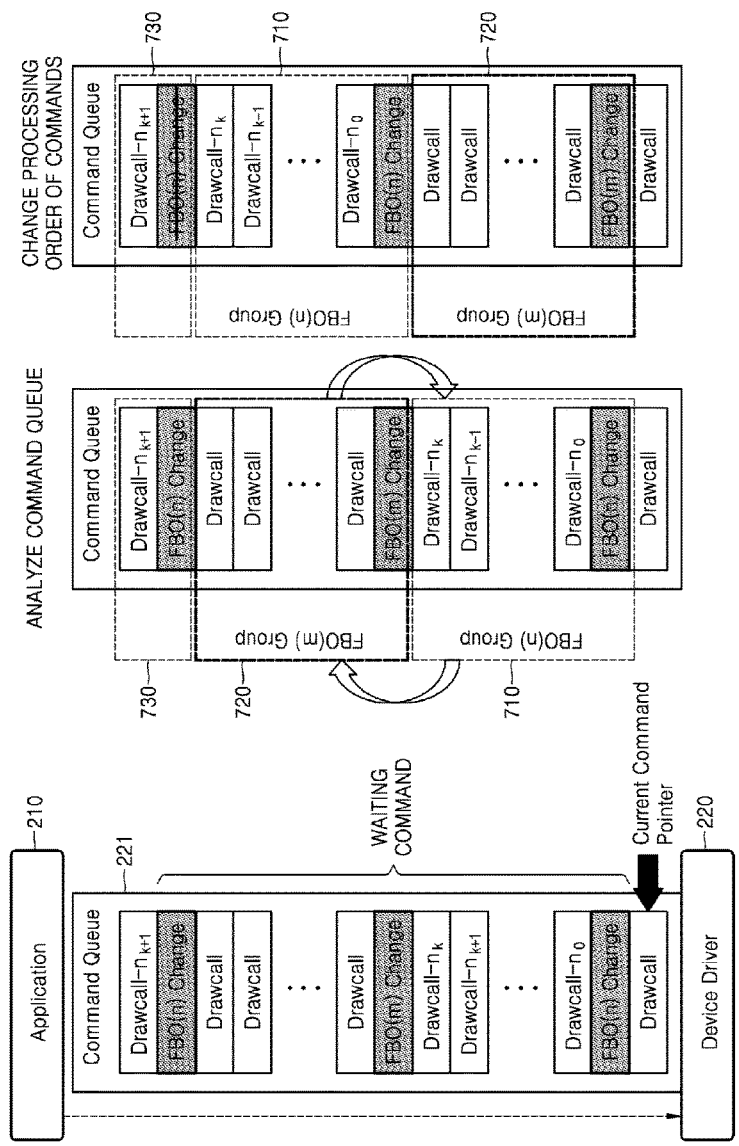
FIG. 7 is a diagram illustrating an operation of changing a processing order of commands according to an embodiment of the present invention.

FIG. 7 is a diagram illustrating an operation of changing a processing order of commands according to an embodiment of the present invention, in which the device driver 300 adjusts a processing order of commands waiting in a command queue 221.

In FIG. 7, an FBO change command is a bind command. Thus, even for a command other than a bind command, a description made with reference to FIG. 7 may also be equally applied to any FBO change command.

The command queue 221 of the device driver 300 stores commands to be processed in their processing order. In FIG. 7, the device driver 300 sequentially processes the commands in an order from the bottom command to the top command in the command queue 221.

The command queue 221 includes three bind commands, among which the two bind commands include commands designating FBO(n) and the one bind command includes a command designating FBO(m). A draw command is provided between bind commands.

The device driver 300 groups commands included in the command queue 221. A first group 710 includes draw commands applied to FBO(n), a second group 720 includes draw commands applied to FBO(m), and a third group 730 includes draw commands applied to FBO(n). The first group 710 and the third group 730 include the draw commands applied to the same FBO(n).

The device driver 300 switches the processing order of the first group 710 and the processing order of the second group 720 with each other. According to the changed processing orders, the device driver 300 sequentially processes the second group 720, the first group 710, and then the third group 730 in that order. The device driver 300 deletes the bind command included in the third group 730 and does not generate a flush command.

Although the first group 710 and the second group 720 are switched with each other in terms of processing order in FIG. 7, the second group 720 and the third group 730 may also be switched with each other.

Figure 8:
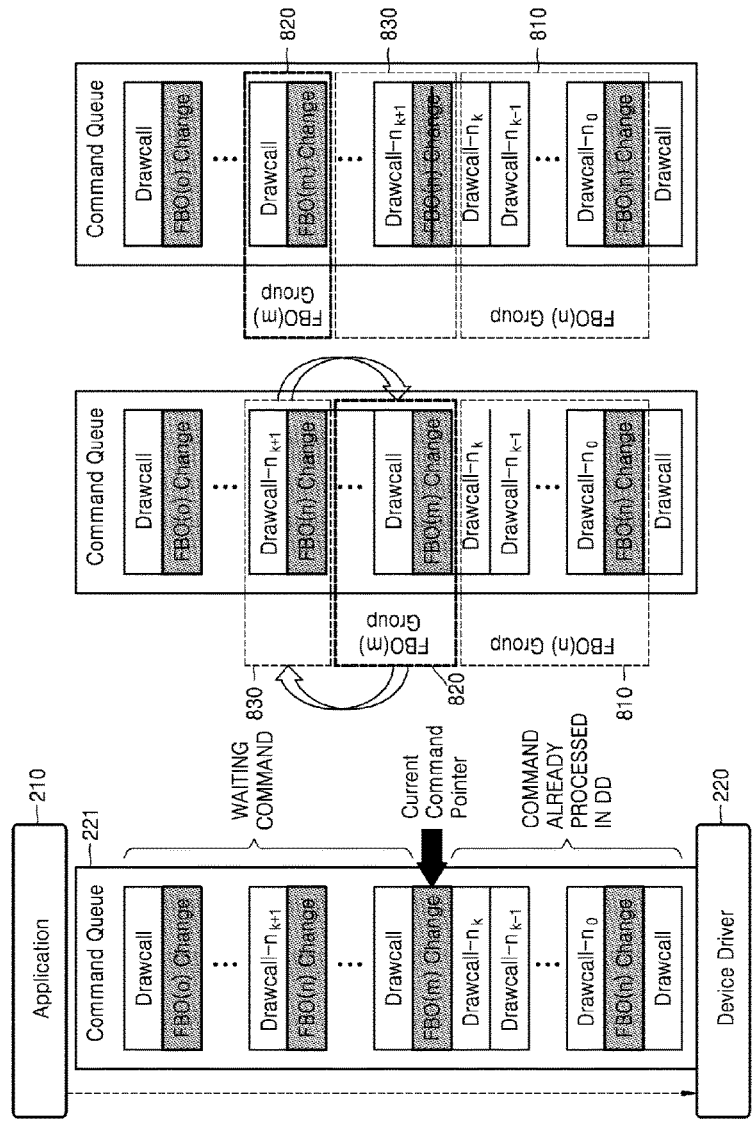
FIG. 8 is another diagram illustrating an operation of changing a processing order of commands according to an embodiment of the present invention.

FIG. 8 is another diagram illustrating an operation of changing a processing order of commands according to an embodiment of the present invention, in which the device driver 300 adjusts a processing order of commands waiting in the command queue 221, taking the FBO currently processed by the GPU 230 into account.

In FIG. 8, an FBO change command is a bind command. Thus, even for a command other than a bind command, a description made with reference to FIG. 8 may also be equally applied to any FBO change command.

The device driver 300 groups commands included in the command queue 221. A first group 810 includes draw commands applied to FBO(n), a second group 820 includes draw commands applied to FBO(m), and a third group 830 includes draw commands applied to FBO(n). The first group 810 and the third group 830 include the draw commands applied to the same FBO(n). However, the commands included in the first group 810 are commands transmitted to the GPU 230.

The device driver 300 adjusts the processing order of commands waiting in the command queue 221, taking the FBO currently processed by the GPU 230 into account. The GPU 230 applies the draw commands to FBO(n). Thus, the device driver 300 processes the third group 830 including the draw commands applied to FBO(n) prior to the second group 820. In other words, the device driver 300 switches the second group 820 and the third group 830 with each other in terms of processing order. The device driver 300 deletes the bind command included in the third group 830 and does not generate a flush command. By preferentially processing the draw commands of the third group 830 prior to the second group 820, it is possible to suppress FBO change by the GPU 230.

FIG. 9 is a flowchart illustrating a method of managing commands according to an embodiment of the present invention. FIG. 9 includes operations performed by the device driver 300 illustrated in FIG. 3. Thus, the foregoing description made regarding the device driver 300, although not being provided below, is also applied to the method of managing commands according to an embodiment illustrated in FIG. 9.

In operation 910, the device driver 300 receives an FBO change command that may be transmitted from the application 210.

In operation 920, the device driver 300 compares an FBO designated by the FBO change command with an FBO currently processed by the GPU 230 to determine whether the two FBOs are the same as each other. The device driver 300 determines whether the two FBOs are the same as each other by comparing IDs or addresses of the FBOs.

In operation 930, the device driver 300 manages an FBO change command or a flush command based on a result of the comparison. The device driver 300 determines whether to generate a flush command based on a result of the comparison. The device driver 300 deletes the FBO change command and does not generate a flush command, if the FBO designated by the FBO change command is the same as the FBO currently processed by the GPU 230. If the FBO designated by the FBO change command is not the same as the FBO currently processed by the GPU 230, the device driver 300 generates the flush command and transmits the flush command, together with the FBO change command, to the GPU 230.

FIG. 10 is a flowchart illustrating a method of managing commands according to an embodiment of the present invention. FIG. 10 includes operations performed by the device driver 300 illustrated in FIG. 3. Thus, the foregoing description made regarding the device driver 300, although not being provided below, is also applied to the method of managing commands according to an embodiment illustrated in FIG. 10.

In operation 1010, the device driver 300 compares FBOs designated by FBO change commands stored in the command queue 221. The FBO change command includes a command designating an FBO. The device driver 300 compares IDs or addresses of the FBOs to determine whether the two FBOs are the same as each other. If a plurality of FBO change commands are stored in the command queue 221, the device driver 300 may adjust the processing order of the FBO change commands before transmitting them to the GPU 230. In other words, the device driver 300 may transmit the FBO change commands to the GPU 230 in the adjusted processing order, instead of an order in which the FBO change commands are received from the application 210.

In operation 1020, the device driver 300 adjusts the processing order of the FBO change commands stored in the command queue 221 based on a result of the comparison. The device driver 300 adjusts the processing order of the FBO change commands to consecutively process the FBO change commands designating the same FBO. The device driver 300 adjusts the processing order of the draw commands applied to the FBO change commands, together with the processing order of the FBO change commands.

In addition, other embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A method of managing commands using a device driver, the method comprising:
   receiving, using at least one processor, a frame buffer object (FBO) change command in a command queue associated with the device driver of a graphics processing unit (GPU);
   comparing, using the at least one processor, an FBO designated by the FBO change command with a current FBO being currently processed by the graphics processing unit (GPU) to determine whether the two FBOs are the same as each other;
   managing, using the at least one processor, the FBO change command or a flush command based on a result of the comparison, the managing including deleting the FBO change command from the command queue if the two FBOs are the same as each other; and
   transmitting, using the at least one processor, the managed command to the GPU.

2. The method of claim 1, wherein the managing of the FBO change command or the flush command comprises:
   avoiding automatically generating the flush command for the FBO change command, if the two FBOs are the same as each other.

3. The method of claim 1, further comprising:
   determining, using the at least one processor, whether there is a draw command in the command queue issued for the current FBO, if the two FBOs are different from each other; and
   wherein the transmitting the managed command includes deleting the flush command from the command queue, if there is no draw command issued for the current FBO.

4. The method of claim 1, wherein the FBO change command is a bind command.

5. A method of managing commands using a device driver, the method comprising:
   comparing, using at least one processor, frame buffer objects (FBOs) change commands stored in a command queue of the device driver of a graphics processing unit (GPU) with each other;
   adjusting, using the at least one processor, a processing order of GPU commands stored in the command queue associated with the FBOs, based on a result of the comparison; and
   transmitting, using the at least one processor, the GPU commands stored in the command queue to the GPU based on the adjusted processing order.

6. The method of claim 5, wherein the comparing of the FBOs change commands comprises:
   comparing the FBOs identified by the FBO change commands with a current FBO being currently processed by the GPU.

7. The method of claim 5, wherein the adjusting of the processing order of the GPU commands comprises:
   grouping the GPU commands in the command queue based on the FBO identified in the GPU commands based on a result of the comparison.

8. The method of claim 5, wherein the FBO change command is a bind command.

9. An apparatus for executing a device driver, the apparatus comprising:
   at least one processor configured to execute computer readable instructions to,
   receive a frame buffer object (FBO) change command in a command queue associated with the device driver of a graphics processing unit (GPU);
   compare an FBO designated by the FBO change command with a current FBO being currently processed by the graphics processing unit (GPU) to determine whether the two FBOs are the same as each other; and
   manage the FBO change command or a flush command based on a result of the comparison, the managing including deleting the FBO change command from the command queue if the two FBOs are the same as each other; and
   transmit the managed command to the GPU.

10. The apparatus of claim 9, wherein the at least one processor is further configured to:
    avoid automatically generating the flush command for the FBO change command, if the two FBOs are the same as each other.

11. The apparatus of claim 9, wherein the at least one processor is further configured to:
    determine whether there is a draw command in the command queue issued for the current FBO, if the two FBOs are different from each other; and
    wherein the transmitting the managed command includes deleting the flush command from the command queue, if there is no draw command issued for the current FBO.

12. The apparatus of claim 9, wherein the FBO change command is a bind command.

13. An apparatus for executing a device driver, the apparatus comprising:
    at least one processor configured to execute computer readable instructions to,
    compare frame buffer objects (FBOs) change commands stored in a command queue of the device driver of a graphics processing unit (GPU) with each other;

adjust a processing order of GPU commands stored in the command queue associated with the FBOs, based on a result of the comparison; and transmit the GPU commands stored in the command queue to the GPU based on the adjusted processing order.

14. The apparatus of claim 13, wherein the at least one processor is further configured to:

compare the FBOs identified designated by the FBO change commands with a FBO being currently processed by the GPU.

15. The apparatus of claim 13, wherein the at least one processor is further configured to:

group the GPU commands in the command queue based on the FBO identified in the GPU commands based on a result of the comparison.

16. The apparatus of claim 13, wherein the FBO change command is a bind command.

* * * * *